US010580342B2

(12) United States Patent
Nakano

(10) Patent No.: US 10,580,342 B2
(45) Date of Patent: Mar. 3, 2020

(54) IMAGE SIGNAL PROCESSING CIRCUIT, DISPLAY DEVICE HAVING THE SAME, AND IMAGE SIGNAL PROCESSING METHOD OF THE DISPLAY DEVICE

(71) Applicant: Samsung Display Co., Ltd., Yongin-si, Gyeonggi-do (KR)

(72) Inventor: Takashi Nakano, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 44 days.

(21) Appl. No.: 16/036,267

(22) Filed: Jul. 16, 2018

(65) Prior Publication Data

US 2019/0147785 A1 May 16, 2019

(30) Foreign Application Priority Data

Nov. 10, 2017 (KR) ........................ 10-2017-0149857

(51) Int. Cl.

| | |
|---|---|
| ***G09G 3/20*** | (2006.01) |
| ***G09G 5/00*** | (2006.01) |
| ***G09G 5/10*** | (2006.01) |
| ***H04N 1/60*** | (2006.01) |
| ***H04N 5/57*** | (2006.01) |

(Continued)

(52) U.S. Cl.
CPC ............. *G09G 3/2003* (2013.01); *G09G 5/00* (2013.01); *G09G 2320/0242* (2013.01); *G09G 2320/0646* (2013.01); *G09G 2340/06* (2013.01)

(58) Field of Classification Search
CPC combination set(s) only.
See application file for complete search history.

(56) References Cited

U.S. PATENT DOCUMENTS 8,379,153 B2 2/2013 Isobe
2002/0039440 A1* 4/2002 Sakuyama ............ H04N 1/646 382/166

(Continued)

FOREIGN PATENT DOCUMENTS

JP 2010-263598 A 11/2010
KR 10-2014-0059386 A 5/2014
KR 10-2017-0052287 A 5/2017

OTHER PUBLICATIONS

YCoCg—Wikipedia, 3pp, last edited Jan. 16, 2018.

*Primary Examiner* — Wesner Sajous
(74) *Attorney, Agent, or Firm* — Lewis Roca Rothgerber Christie LLP

(57) ABSTRACT

An image signal processing circuit of a display apparatus includes: a color converter converting first image signals to a first brightness signal, a first color difference signal, and a second color difference signal; a brightness emphasizer outputting a second brightness signal obtained by emphasizing an alternating current component of the first brightness signal; a brightness limiter determining an upper limit value and a lower limit value based on the first color difference signal and the second color difference signal and converting the second brightness signal to a third brightness signal between the upper limit value and the lower limit value; and a color inverse converter converting the third brightness signal, the first color difference signal, and the second color difference signal to second image signals.

20 Claims, 7 Drawing Sheets

(51) Int. Cl.
*H04N 9/64* (2006.01)
*H04N 9/77* (2006.01)

(56) References Cited

U.S. PATENT DOCUMENTS

| | | | | |
|---|---|---|---|---|
| 2002/0159644 | A1* | 10/2002 | Sakuyama | G06T 9/00 382/240 |
| 2014/0125711 | A1* | 5/2014 | Onishi | G09G 3/3406 345/690 |
| 2016/0006939 | A1* | 1/2016 | Suzuki | H04N 5/2355 348/239 |
| 2018/0089810 | A1* | 3/2018 | Hirai | G06T 5/007 |

* cited by examiner

IMAGE SIGNAL PROCESSING CIRCUIT, DISPLAY DEVICE HAVING THE SAME, AND IMAGE SIGNAL PROCESSING METHOD OF THE DISPLAY DEVICE

CROSS-REFERENCE TO RELATED APPLICATION

This application claims priority to and the benefit of Korean Patent Application No. 10-2017-0149857, filed on Nov. 10, 2017, the content of which is hereby incorporated by reference in its entirety.

BACKGROUND

1. Field

The present disclosure relates to a display device. More particularly, the present disclosure relates to a display device including an image signal processing circuit.

2. Description of the Related Art

In recent years, flat panel displays having advantages, such as large area, thin thickness, lightweight, etc., have been widely used as display devices. Examples of the flat panel displays that are used include a liquid crystal display (LCD), a plasma display panel (PDP), an organic light emitting display (OLED), and the like.

A display device can emphasize an alternating current component of a brightness signal in an image signal to improve a display quality. In a case that the image signal is inversely converted into an image signal with red, green, and blue colors using one or more color difference signals and the brightness signal of which the alternating current component is emphasized, a range of the inversely-converted image signal may likely be out of a displayable range of the display device. When the range of the inversely-converted image signal is limited, a chroma of the inversely-converted image signal becomes lower than that of a raw image signal, and thus, the display quality is deteriorated.

SUMMARY

Aspects of embodiments of the present disclosure are directed toward an image signal processing circuit and a display device having the image signal processing circuit, which are capable of emphasizing an alternating current component of a brightness signal in an image signal and protecting or preventing a display quality from deteriorating.

Aspects of embodiments of the present disclosure are directed toward an image signal processing method capable of emphasizing the alternating current component of the brightness signal in the image signal.

Embodiments of the inventive concept provide an image signal processing circuit including: a color converter converting first image signals to a first brightness signal, a first color difference signal, and a second color difference signal; a brightness emphasizer outputting a second brightness signal obtained by emphasizing an alternating current component of the first brightness signal; a brightness limiter determining an upper limit value and a lower limit value based on the first color difference signal and the second color difference signal and converting the second brightness signal to a third brightness signal between the upper limit value and the lower limit value; and a color inverse converter converting the third brightness signal, the first color difference signal, and the second color difference signal to second image signals.

In some embodiments, the brightness emphasizer includes: a filter extracting the alternating current component of the first brightness signal; a first operator operating the extracted alternating current component and a gain to output a first intermediate signal, an amplitude limiter limiting an amplitude of the first intermediate signal to output a second intermediate signal; and a second operator operating the second intermediate signal and the first brightness signal to output the second brightness signal.

In some embodiments, the filter is a high pass filter that passes a high-frequency component of the first brightness signal.

In some embodiments, the filter is a band pass filter that passes a predetermined frequency band of the first brightness signal.

In some embodiments, the amplitude limiter sets the first intermediate signal to an amplitude upper limit value when the first intermediate signal is greater than the amplitude upper limit value and sets the first intermediate signal to an amplitude lower limit value when the first intermediate signal is smaller than the amplitude lower limit value.

In some embodiments, the first operator is a multiplier that multiplies the extracted alternating current component and the gain.

In some embodiments, the second operator is an adder that adds the second intermediate signal to the first brightness signal.

In some embodiments, when the first color difference signal is equal to or greater than zero (0), the upper limit value LimU and the lower limit value LimL are obtained by satisfying the following $$LimU = \begin{cases} YMAX - (Cg+1)/2 & (Cg > Co/2) \\ YMAX - (1 - Co + Cg + CMB)/2 & \text{(otherwise)} \end{cases} \quad \text{and}$$

$$LimL = \begin{cases} -Cg/2 & (Cg > -Co/2) \\ (Co + Cg - CMB)/2 & \text{(otherwise)} \end{cases},$$

respectively, when the first color difference signal is smaller than zero (0), the upper limit value LimU and the lower limit value LimL are obtained by satisfying the following $$LimU = \begin{cases} YMAX - (Cg+1)/2 & (Cg > -Co/2) \\ YMAX - (1 - Co - Cg + CMB)/2 & \text{(otherwise)} \end{cases} \quad \text{and}$$

$$LimL = \begin{cases} -Cg/2 & (Cg \le Co/2) \\ (Cg - Co - CMB)/2 & \text{(otherwise)} \end{cases},$$

respectively, and a logical operation of the least significant bit of each of the first color difference signal and the second color difference signal is obtained by following Equation of CMB=Co&Cg&1. The "YMAX" denotes a maximum value of the second brightness signal, the "Co" denotes the first color difference signal, the "Cg" denotes the second color difference signal, and "&" denotes a bit logical operation. The brightness limiter sets the second brightness signal to the upper limit value when the second brightness signal is greater than the upper limit value, and the brightness limiter sets the second brightness signal to the lower limit value when the second brightness signal is smaller than the lower limit value.

In some embodiments, the color converter operates to satisfy the following Co=R−B, t=B+Co/2, Cg=G−t, and Y=t+Cg/2, the R, G, and B denote red, green, and blue signals of the first image signals, respectively, the "Y" denotes the first brightness signal, the "Co" denotes the first color difference signal, and the "Cg" denotes the second color difference signal.

In some embodiments, the color inverse converter operates to satisfy the following t=Y3−Cg/2, G'=Cg+t, B'=t−Co/2, and R'=Co+B', the R', G', and B' denote red, green, and blue signals of the second image signals, respectively, the "Y3" denotes the third brightness signal, the "Co" denotes the first color difference signal, and the "Cg" denotes the second color difference signal.

Embodiments of the inventive concept provide a display device including: a display panel including a plurality of pixels; and a driving circuit receiving first image signals, applying data signals corresponding to second image signals to the pixels, and controlling the pixels to display an image.

In some embodiments, the driving circuit includes an image signal processing circuit that converts the first image signals to the second image signals, and the image signal processing circuit includes: a color converter converting the first image signals to a first brightness signal, a first color difference signal, and a second color difference signal; a brightness emphasizer outputting a second brightness signal obtained by emphasizing an alternating current component of the first brightness signal; a brightness limiter determining an upper limit value and a lower limit value based on the first color difference signal and the second color difference signal and converting the second brightness signal to a third brightness signal between the upper limit value and the lower limit value; and a color inverse converter converting the third brightness signal, the first color difference signal, and the second color difference signal to second image signals.

In some embodiments, the brightness emphasizer includes: a filter extracting the alternating current component of the first brightness signal; a first operator operating the extracted alternating current component and a gain to output a first intermediate signal, an amplitude limiter limiting an amplitude of the first intermediate signal to output a second intermediate signal; and a second operator operating the second intermediate signal and the first brightness signal to output the second brightness signal.

In some embodiments, the amplitude limiter sets the first intermediate signal to an amplitude upper limit value when the first intermediate signal is greater than the amplitude upper limit value and sets the first intermediate signal to an amplitude lower limit value when the first intermediate signal is smaller than the amplitude lower limit value.

In some embodiments, the first operator is a multiplier that multiplies the extracted alternating current component and the gain.

In some embodiments, the second operator is an adder that adds the second intermediate signal to the first brightness signal.

In some embodiments, when the first color difference signal is equal to or greater than zero (0), the upper limit value LimU and the lower limit value LimL are obtained by satisfying the following $$LimU = \begin{cases} YMAX - (Cg+1)/2 & (Cg > Co/2) \\ YMAX - (1 - Co + Cg + CMB)/2 & \text{(otherwise)} \end{cases} \text{ and}$$

-continued $$LimL = \begin{cases} -Cg/2 & (Cg > -Co/2) \\ (Co + Cg - CMB)/2 & \text{(otherwise)} \end{cases},$$

respectively, when the first color difference signal is smaller than zero (0), the upper limit value LimU and the lower limit value LimL are obtained by satisfying the following $$LimU = \begin{cases} YMAX - (Cg+1)/2 & (Cg > -Co/2) \\ YMAX - (1 - Co - Cg + CMB)/2 & \text{(otherwise)} \end{cases} \text{ and}$$

$$LimL = \begin{cases} -Cg/2 & (Cg \le Co/2) \\ (Cg - Co - CMB)/2 & \text{(otherwise)} \end{cases},$$

respectively, and a logical operation of a least significant bit of each of the first color difference signal and the second color difference signal is obtained by following Equation of CMB=Co&Cg&1. The "YMAX" denotes a maximum value of the second brightness signal, the "Co" denotes the first color difference signal, the "Cg" denotes the second color difference signal, and "&" denotes a bit logical operation. The brightness limiter sets the second brightness signal to the upper limit value when the second brightness signal is greater than the upper limit value, and the brightness limiter sets the second brightness signal to the lower limit value when the second brightness signal is smaller than the lower limit value.

Embodiments of the inventive concept provide a method of processing an image signal of a display apparatus including: converting first image signals to a first brightness signal, a first color difference signal, and a second color difference signal by using a color converter; outputting a second brightness signal obtained by emphasizing an alternating current component of the first brightness signal by using a brightness emphasizer; determining an upper limit value and a lower limit value based on the first color difference signal and the second color difference signal and converting the second brightness signal to a third brightness signal between the upper limit value and the lower limit value by using a brightness limiter; converting the third brightness signal, the first color difference signal, and the second color difference signal to second image signals by using a color inverse converter; and providing data signals corresponding to the second image signals to a display panel.

In some embodiments, the outputting of the second brightness signal includes: extracting the alternating current component of the first brightness signal; operating the extracted alternating current component and a gain to output a first intermediate signal; limiting an amplitude of the first intermediate signal to output a second intermediate signal; and operating the second intermediate signal and the first brightness signal to output the second brightness signal.

In some embodiments, the outputting of the second intermediate signal includes: setting the first intermediate signal to an amplitude upper limit value when the first intermediate signal is greater than the amplitude upper limit value; and setting the first intermediate signal to an amplitude lower limit value when the first intermediate signal is smaller than the amplitude lower limit value.

In some embodiments, the converting of the second brightness signal to the third brightness signal includes: setting the second brightness signal to the upper limit value when the second brightness signal is greater than the upper limit value; and setting the second brightness signal to the lower limit value when the second brightness signal is smaller than the lower limit value.

According to one or more of the above embodiments, the image signal processing circuit may inversely-convert the first brightness signal Y and the first and second color difference signals Co and Cg to the RGB signals after emphasizing the alternating current component of the brightness signal Y in the YCoGg color space and limiting only the first brightness signal Y without exerting influence on the first and second color difference signals Co and Cg. Accordingly, there is no need to limit the range of the inversely-converted RGB signals, and thus the display quality may be protected or prevented from burning and deteriorating.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Hereinafter, the present invention will be explained in detail with reference to the accompanying drawings.

Figure 1:
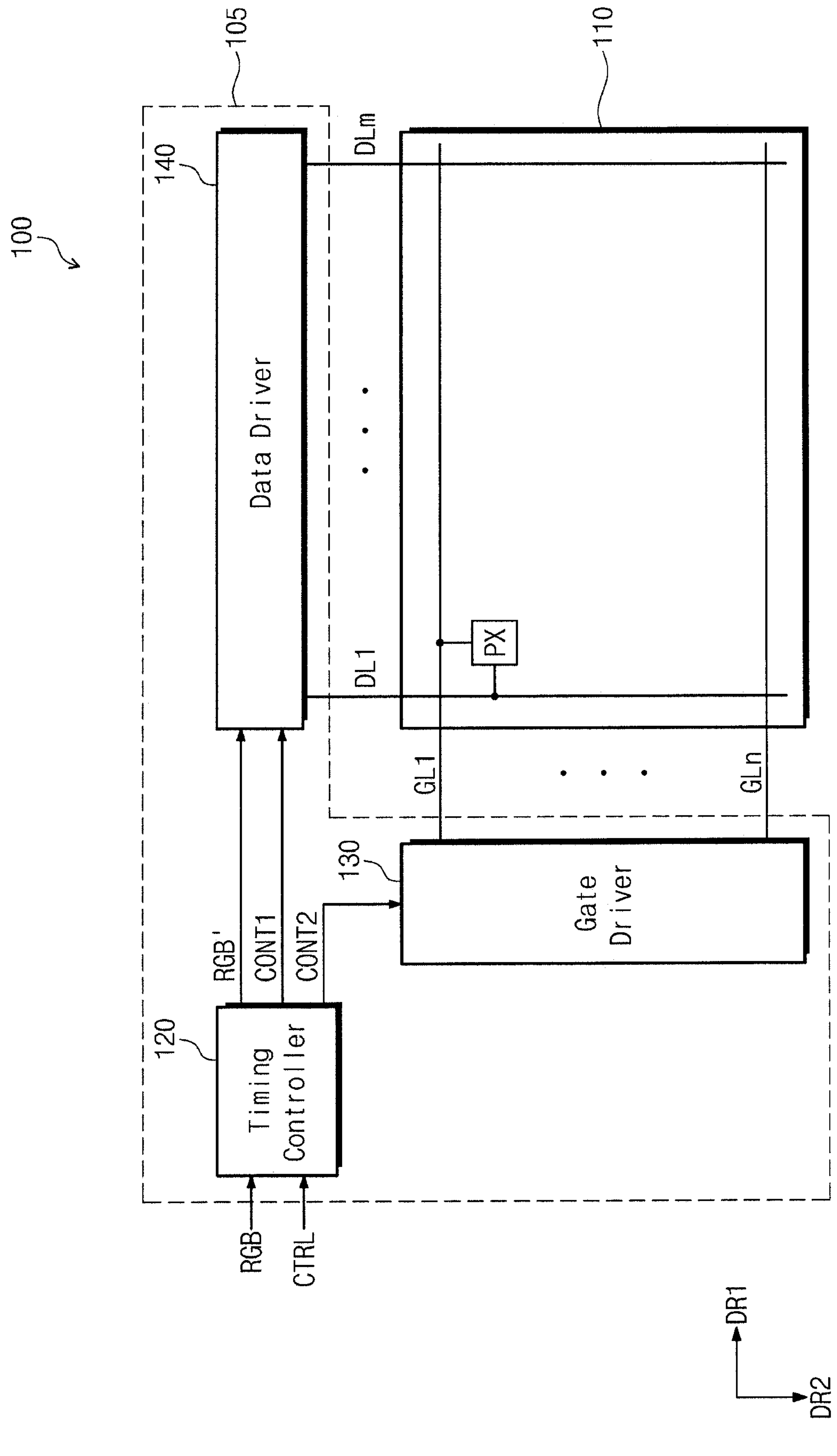
FIG. 1 is a block diagram showing a configuration of a display device according to an exemplary embodiment of the present disclosure.

FIG. 1 is a block diagram showing a configuration of a display device 100 according to an exemplary embodiment of the present disclosure.

Referring to FIG. 1, the display device 100 includes a display panel 110 and a driving circuit 105.

The display panel 110 may be one of various display panels, such as a liquid crystal display panel, an organic light emitting display panel, an electrophoretic display panel, an electrowetting display panel, etc. In a case that the liquid crystal display panel is used as the display panel 110, the display device 100 may further include a backlight unit to provide a light to the display panel 110.

The display panel 110 includes a plurality of gate lines GL1 to GLn extending in a first direction DR1, a plurality of data lines DL1 to DLm extending in a second direction DR2, and a plurality of pixels PX arranged in areas defined by the gate lines GL1 to GLn and the data lines DL1 to DLm crossing the gate lines GL1 to GLn. The data lines DL1 to DLm are insulated from the gate lines GL1 to GLn. Each of the pixels PX is connected to a corresponding gate line among the gate lines GL1 to GLn and a corresponding data line among the data lines DL1 to DLm.

The driving circuit 105 receives first image signals RGB and applies data signals corresponding to second image signals RGB' to the pixels through the data lines DL1 to DLm of the display panel 110 to display an image through the pixels PX. In the exemplary embodiment of the present disclosure, the driving circuit 105 may output the second image signals RGB' obtained by emphasizing an alternating current component of a brightness signal in the first image signals RGB.

The driving circuit 105 includes a timing controller 120, a gate driver 130, and a data driver 140. The timing controller 120 receives the first image signals RGB and control signals CTRL from an external source. The control signals CTRL include, for example, a vertical synchronization signal, a horizontal synchronization signal, a main clock signal, and a data enable signal. On the basis of the control signals CTRL, the timing controller 120 provides: the second image signals RGB', which are obtained by processing the first image signals RGB to correspond to an operation condition of the display panel 110; a first control signal CONT1 to the data driver 140; and a second control signal CONT2 to the gate driver 130. The first control signal CONT1 includes a horizontal synchronization start signal, a clock signal, and a line latch signal; and the second control signal CONT2 includes a vertical synchronization start signal, an output enable signal, and a gate pulse signal. The timing controller 120 may change the second image signals RGB' in various suitable ways depending on an arrangement of the pixels PX of the display panel 110 and a display frequency of the display panel 110 and output the changed second image signals RGB'.

The gate driver 130 drives the gate lines GL1 to GLn in response to the second control signal CONT2 from the timing controller 120. The gate driver 130 may include a gate driving integrated circuit. According to another embodiment, the gate driver 130 may be implemented in a circuit with oxide semiconductor, amorphous semiconductor, crystalline semiconductor, polycrystalline semiconductor, or the like and formed in a set or predetermined area of the display panel 110. In this case, the gate driver 130 may be concurrently or simultaneously formed with the pixels PX through a thin film process.

The data driver 140 drives the data lines DL1 to DLm in response to the second image signals RGB' and the first control signal CONT1 from the timing controller 120.

Figure 2:
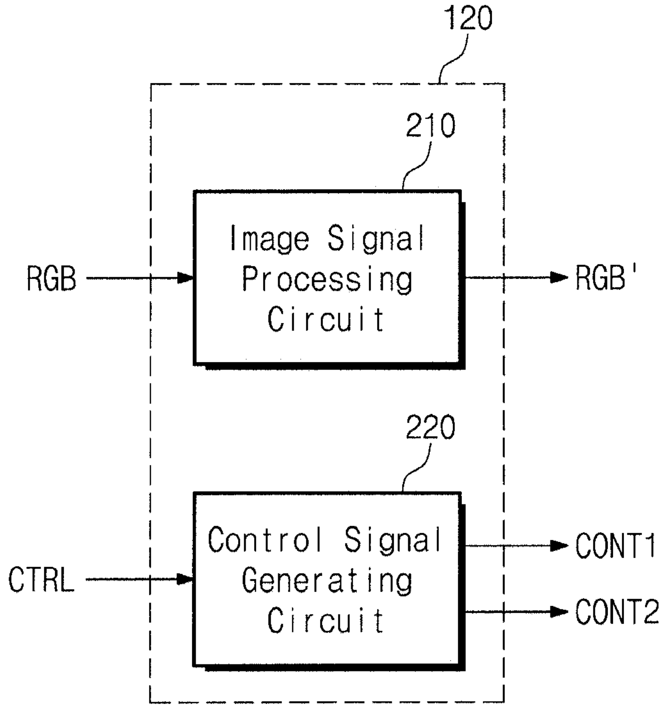
FIG. 2 is a block diagram showing a configuration of a timing controller according to an exemplary embodiment of the present disclosure.

FIG. 2 is a block diagram showing a configuration of the timing controller 120 according to an exemplary embodiment of the present disclosure.

Referring to FIG. 2, the timing controller 120 includes an image signal processing circuit 210 and a control signal generating circuit 220.

The image signal processing circuit 210 outputs the second image signals RGB' obtained by emphasizing the brightness signal of the first image signals RGB from the external source. The control signal generating circuit 220 outputs the first control signal CONT1 and the second control signal CONT2 based on the control signals CTRL from the external source. The first control signal CONT1 includes the horizontal synchronization start signal, the clock signal, and the line latch signal, and the second control signal CONT2 includes the vertical synchronization start signal, the output enable signal, and the gate pulse signal.

Figure 3:
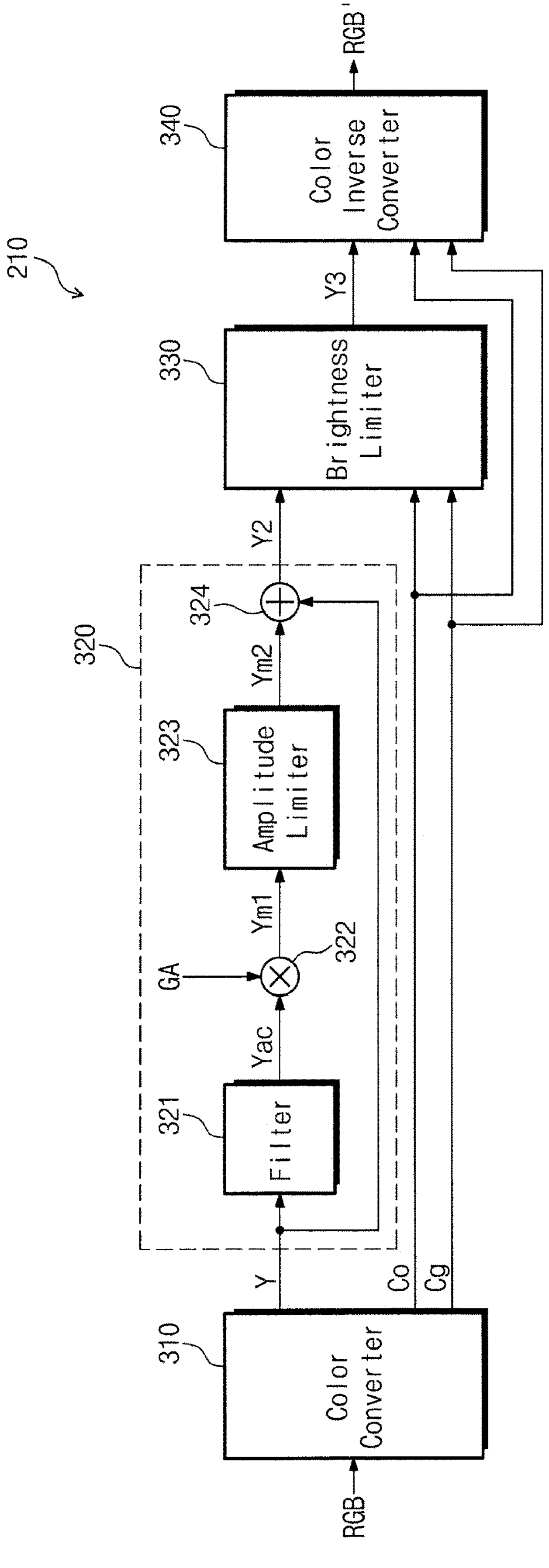
FIG. 3 is a block diagram showing a configuration of an image signal processing circuit according to an exemplary embodiment of the present disclosure.

FIG. 3 is a block diagram showing a configuration of the image signal processing circuit 210 according to an exemplary embodiment of the present disclosure.

Referring to FIG. 3, the image signal processing circuit 210 includes a color converter 310, a brightness emphasizer 320, a brightness limiter 330, and a color inverse converter 340. The color converter 310 converts the first image signals RGB to a first brightness signal Y, a first color difference signal Co, and a second color difference signal Cg. The first color difference signal Co may be an orange color difference signal, and the second color difference signal Cg may be a green color difference signal. The first image signals RGB may include a red color signal R, a green color signal G, and a blue color signal B.

A YCoCg color space is a color space different from visual characteristics of a human, but an operation to convert an RGB color space to the YCoCg color space, or vice versa, is simple when compared with a YCbCr color space. In addition, the YCoCg color space has an advantage that there is no loss of image in restoring the YCoCg color space to the RGB color space. Accordingly, it is appropriate to use the YCoCg color space in separating the first brightness signal Y from the first image signals RGB.

As an example, the color converter 310 may convert the first image signals RGB of the RGB color space to the first brightness signal Y, the first color difference signal Co, and the second color difference signal Cg of the YCoCg color space by satisfying Equation 1.

$$Co=R-B$$

$$t=B+Co/2$$

$$Cg=G-t$$

$$Y=t+Cg/2 \qquad \text{Equation 1}$$

In Equation 1, R, G, and B respectively denote the red, green, and blue color signals of the first image signals RGB. When each of the R, G, and B is a k-bit signal, the first brightness signal Y has k bit, the first color difference signal Co has k+1 bits, and the second color difference signal Cg has k+1 bits. In Equation 1, a decimal point of the operation result is discarded. That is, each of the Y, Co, Cg, and t is an integer number.

The brightness emphasizer 320 outputs a second brightness signal Y2 obtained by emphasizing the alternating current component of the first brightness signal Y. The brightness emphasizer 320 includes a filter 321, a first operator 322, an amplitude limiter 323, and a second operator 324.

The filter 321 extracts the alternating current component of the first brightness signal Y and outputs an alternating current component signal Yac. The filter 321 may include a high pass filter (HPF) that passes a high-frequency component of the first brightness signal Y. According to another embodiment, the filter 321 may include a band pass filter (BPF) that passes a specific-frequency band component of the first brightness signal Y. According to another embodiment, the filter 321 may include a combination of the high pass filter (HPF) and the band pass filter (BPF).

The first operator 322 operates the alternating current component signal Yac and a gain GA to output a first intermediate signal Ym1. The first operator 322 may be a multiplier to multiply the alternating current component signal Yac by the gain GA. That is, the alternating current component of the first brightness signal Y may be amplified by multiplying the alternating current component signal Yac by the gain GA by the first operator 322.

The amplitude limiter 323 limits an amplitude of the first intermediate signal Ym1 to output a second intermediate signal Ym2. The amplitude limiter 323 sets the first intermediate signal Ym1 to an amplitude upper limit value ENHMAX when the first intermediate signal Ym1 is greater than the amplitude upper limit value ENHMAX, and the amplitude limiter 323 sets the first intermediate signal Ym1 to an amplitude lower limit value −ENHMAX when the first intermediate signal Ym1 is smaller than the amplitude lower limit value −ENHMAX.

An operation of the amplitude limiter 323 satisfies Equation 2.

$$Ym2(Ym1)=\begin{cases}-ENHMAX & (Ym1<-ENHMAX)\\ ENHMAX & (Ym1>ENHMAX)\\ Ym1 & (\text{otherwise})\end{cases} \qquad \text{Equation 2}$$

The second operator 324 utilizes (e.g., operates) the second intermediate signal Ym2 and the first brightness signal Y to output the second brightness signal Y2. The second operator 324 may be an adder that adds the second intermediate signal Ym2 to the first brightness signal Y. When the second intermediate signal Ym2 is added to the first brightness signal Y by the second operator 324, the second brightness signal Y2 of which the alternating current component is emphasized may be output.

The brightness limiter 330 determines an upper limit value LimU and a lower limit value LimL based on the first color difference signal Co and the second color difference signal Cg and converts the second brightness signal Y2 to a third brightness signal Y3 between the upper limit value LimU and the lower limit value LimL.

The brightness limiter 330 determines the upper limit value LimU and the lower limit value LimL depending on a value of the first color difference signal Co.

The brightness limiter 330 determines the upper limit value LimU and the lower limit value LimL by satisfying Equation 3 when the first color difference signal Co is equal to or greater than zero (0).

$$CMB=Co\,\&Cg\,\&1 \qquad \text{Equation 3}$$

$$LimU=\begin{cases}YMAX-(Cg+1)/2 & (Cg>Co/2)\\ YMAX-(1-Co+Cg+CMB)/2 & (\text{otherwise})\end{cases}$$

$$LimL=\begin{cases}-Cg/2 & (Cg>-Co/2)\\ (Co+Cg-CMB)/2 & (\text{otherwise})\end{cases}$$

The brightness limiter 330 determines the upper limit value LimU and the lower limit value LimL by satisfying Equation 4 when the first color difference signal Co is smaller than zero (0).

$$CMB=Co\,\&Cg\,\&1 \qquad \text{Equation 4}$$

$$LimU=\begin{cases}YMAX-(Cg+1)/2 & (Cg>-Co/2)\\ YMAX-(1-Co-Cg+CMB)/2 & (\text{otherwise})\end{cases}$$

$$LimL=\begin{cases}-Cg/2 & (Cg\le Co/2)\\ (Cg-Co-CMB)/2 & (\text{otherwise})\end{cases}$$

In Equations 3 and 4, YMAX denotes a maximum value of the second brightness signal Y2, and "&" denotes a bit logical operation. CMB denotes a logical operation of the least significant bit of each of the first color difference signal Co and the second color difference signal Cg. For instance, "Co&Cg" may indicate a logical AND operation of the least significant bit of the first color difference signal Co and the least significant bit of the second color difference signal Cg.

The brightness limiter 330 outputs the third brightness signal Y3 based on the determined upper limit value LimU and the lower limit value LimL. That is, when the second brightness signal Y2 is greater than the upper limit value LimU, the second brightness signal Y2 is set to the upper limit value LimU, and when the second brightness signal Y2 is smaller than the lower limit value LimL, the second brightness signal Y2 is set to the lower limit value LimL. The operation of the brightness limiter 330 that outputs the third brightness signal Y3 based on the upper limit value LimU and the lower limit value LimL satisfies Equation 5.

$$Y3(Y2) = \begin{cases} LimL & (Y2 < LimL) \\ LimU & (Y2 > LimU) \\ Y2 & \text{(otherwise)} \end{cases} \qquad \text{Equation 5}$$

The color inverse converter 340 converts the third brightness signal Y3, the first color difference signal Co, and the second color difference signal Cg to the second image signals RGB'.

The color inverse converter 340 converts the third brightness signal Y3, the first color difference signal Co, and the second color difference signal Cg of the YCoCg color space to the second image signals RGB' of the RGB color space.

As an example, the color inverse converter 340 may convert the third brightness signal Y3, the first color difference signal Co, and the second color difference signal Cg to the second image signals RGB' by satisfying Equation 6.

$$t = Y3 - Cg/2$$

$$G' = Cg + t$$

$$B' = t - Co/2$$

$$R' = Co + B' \qquad \text{Equation 6}$$

In Equation 6, R', G', and B' respectively denote the red color signal, the green color signal, and the blue color signal of the second image signals RGB'.

Since the third brightness signal Y3 is limited within the upper limit value LimU and the lower limit value LimL by the brightness limiter 330, there is no need to limit the brightness of the second image signals RGB' output from the color inverse converter 340.

In addition, since the brightness limiter 330 limits only the range of the third brightness signal Y3 without changing the first color difference signal Co and the second color difference signal Cg, the deterioration of the chroma may be reduced. Further, since the operation for the emphasis of the brightness in the YCoCg color space is performed, the operation may be performed quickly, and the number of bits of the third brightness signal Y3 may be blocked or prevented from increasing by limiting the range of the third brightness signal Y3.

Figure 4:
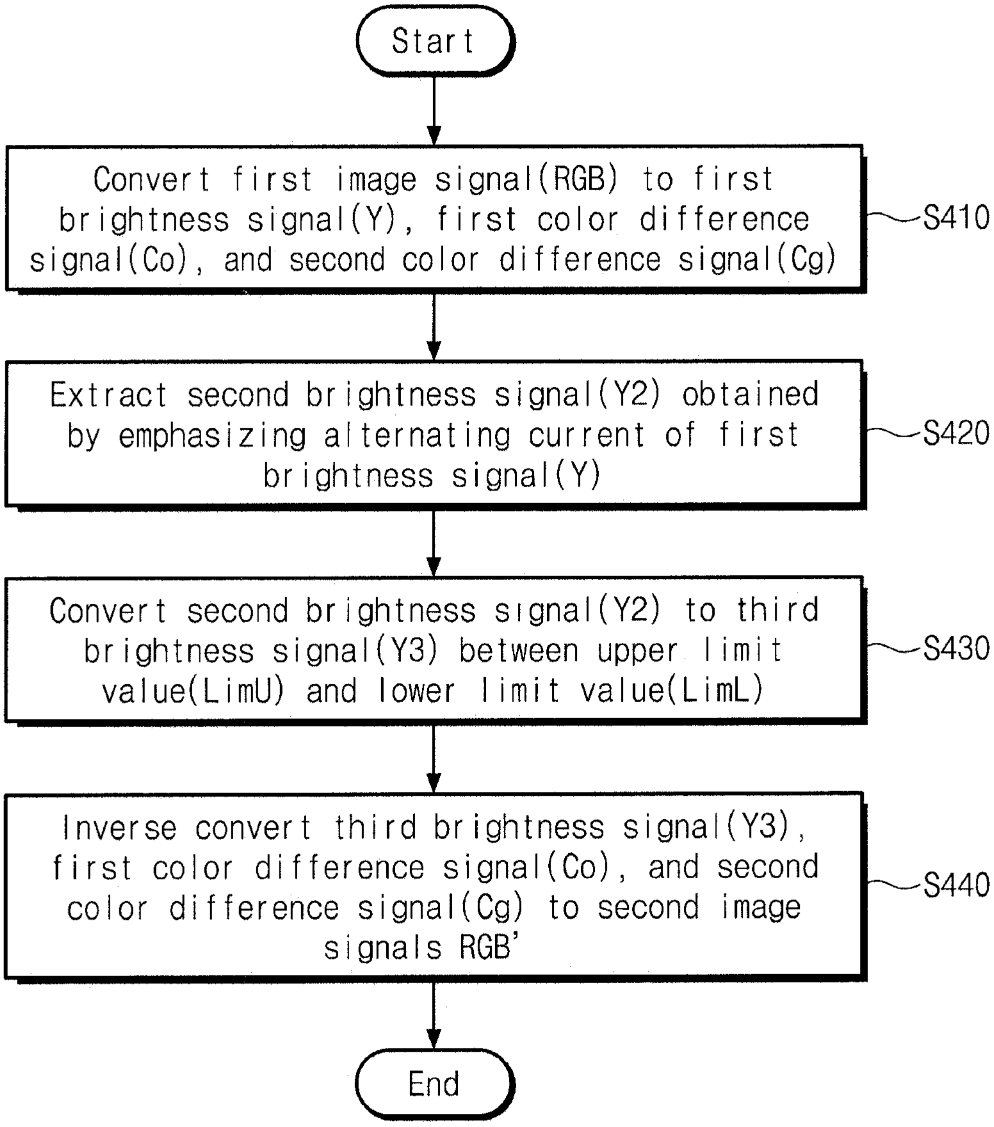
FIG. 4 is a flowchart showing an image signal processing method of a display device according to an exemplary embodiment of the present disclosure.

FIG. 4 is a flowchart showing an image signal processing method of a display device according to an exemplary embodiment of the present disclosure.

Referring to FIGS. 3 and 4, the color converter 310 of the image signal processing circuit 210 in the display device 100 (refer to FIG. 1) converts the first image signals RGB to the first brightness signal Y, the first color difference signal Co, and the second color difference signal Cg (S410). The first image signals RGB correspond to signals of the RGB color space including the red color signal, the green color signal, and the blue color signal. The first brightness signal Y, the first color difference signal Co, and the second color difference signal Cg correspond to signals of the YCoCg color space.

The brightness emphasizer 320 outputs the second brightness signal Y2 obtained by emphasizing the alternating current component of the first brightness signal Y (S420). The brightness emphasizer 320 extracts the alternating current component signal Yac of the first brightness signal Y and adds the second intermediate signal Ym2, which is obtained by limiting the amplitude of the second intermediate signal Ym2 after multiplying the alternating current component signal Yac by the gain GA, to the first brightness signal Y, and thus the brightness emphasizer 320 may output the second brightness signal Y2 of which the alternating current component is emphasized.

The brightness limiter 330 converts the second brightness signal Y2 to the third brightness signal Y3 between the upper limit value LimU and the lower limit value LimL (S430). The brightness limiter 330 determines the upper limit value LimU and the lower limit value LimL based on the first color difference signal Co and the second color difference signal Cg and converts the second brightness signal Y2 to the third brightness signal Y3 between the upper limit value LimU and the lower limit value LimL. Since the brightness limiter 330 limits only the range of the third brightness signal Y3 without changing the first color difference signal Co and the second color difference signal Cg, the deterioration of the chroma may be reduced.

The color inverse converter 340 converts the third brightness signal Y3, the first color difference signal Co, and the second color difference signal Cg of the YCoCg color space to the second image signals RGB' of the RGB color space (S440).

Since the operation for the emphasis of the brightness in the YCoCg color space is performed and the range of third brightness signal Y3 is limited by the brightness limiter 330, there is no need to limit the range of the second image signals RGB' of the RGB color space. Accordingly, the display quality may be protected or prevented from burning and deteriorating.

Figure 5:
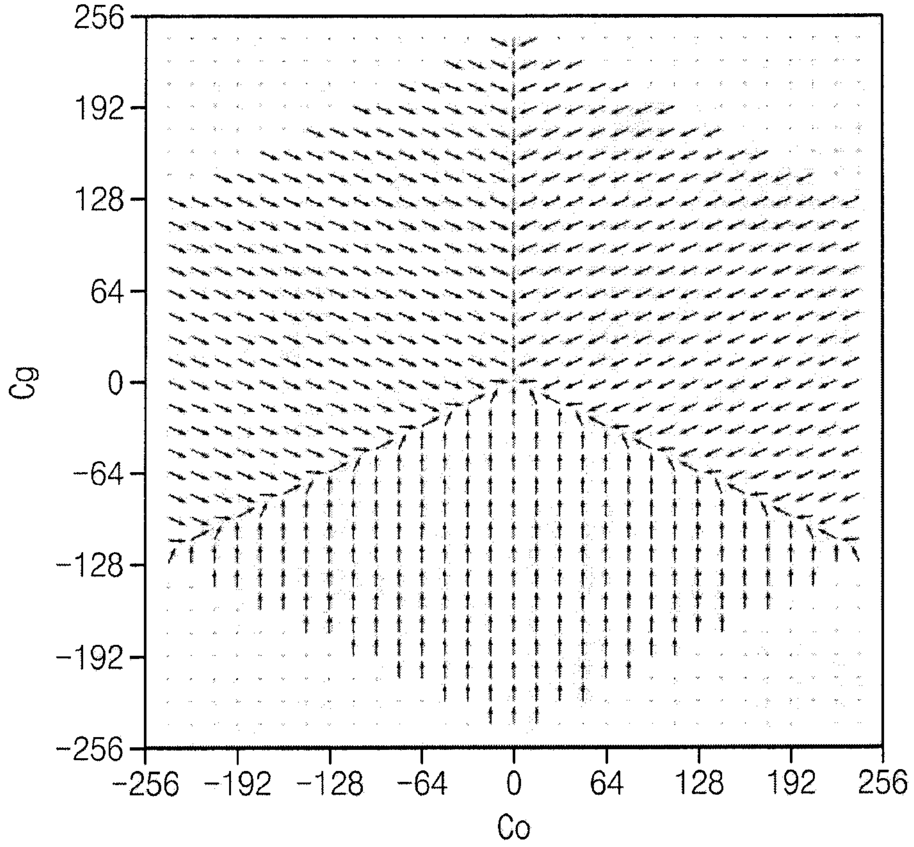
FIGS. 5 and 6 are views showing a direction of a color distortion of a first color difference signal and a second color difference signal in a comparable display device.
Figure 6:
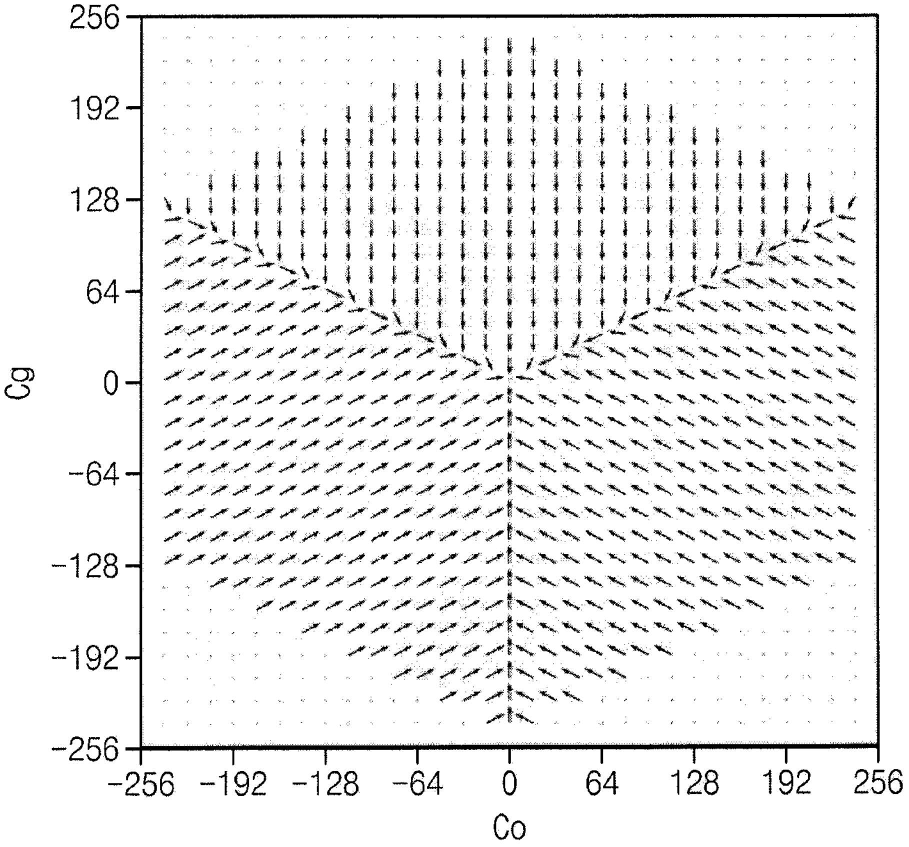

FIGS. 5 and 6 are views showing a direction of a color distortion of a first color difference signal and a second color difference signal in a comparable display device.

Referring to FIGS. 3, 5, and 6, since a comparable image signal processing circuit does not include the brightness limiter 330 according to the present disclosure, there is a need to limit the range of the second image signals RGB' output from the color inverse converter 340.

For instance, when a grayscale value of a red color signal R' among the second image signals RGB' is smaller than zero (0), the red color signal R' is set to zero (0). When the grayscale value of the red color signal R' among the second image signals RGB' is greater than an upper limit value RMAX, the red color signal R' is set to the upper limit value RMAX.

The limit processing process applied to the second image signals RGB' satisfies Equation 7.

$$R''(R') = \begin{cases} 0 & (R' < 0) \\ RMAX & (R' > RMAX) \\ R' & \text{(otherwise)} \end{cases} \qquad \text{Equation 7}$$

-continued $$G''(G') = \begin{cases} 0 & (G' < 0) \\ GMAX & (G' > GMAX) \\ G' & (\text{otherwise}) \end{cases}$$

$$B''(B') = \begin{cases} 0 & (B' < 0) \\ BMAX & (B' > BMAX) \\ B' & (\text{otherwise}) \end{cases}$$

As described above, in the case that the range of the second image signals RGB' is forcibly limited, the value of each of the first color difference signal Co and the second color difference signal Cg becomes close to zero when the second image signals RGB' are represented by the YCoCg color space.

FIG. 5 shows the color distortion of the first color difference signal Co and the second color difference signal Cg when the brightness component Yc of the second image signals RGB' is smaller than the lower limit value LimL (Yc<LimL). FIG. 6 shows the color distortion of the first color difference signal Co and the second color difference signal Cg when the brightness component Yc of the second image signals RGB' is greater than the upper limit value LimU (Yc>LimL).

In FIGS. 5 and 6, moving directions of the first color difference signal Co and the second color difference signal Cg of the second image signals RGB' from the first color difference signal Co and the second color difference signal Cg of the first image signals RGB are represented by arrows or vectors. As shown in FIGS. 5 and 6, a color shift of the first color difference signal Co and the second color difference signal Cg of the second image signals RGB' occurs in a direction close to the zero (0) from the first color difference signal Co and the second color difference signal Cg of the first image signals RGB. As described above, when the chroma is deteriorated, the display quality may be deteriorated even though the alternating current component of the brightness is emphasized.

Figure 7:
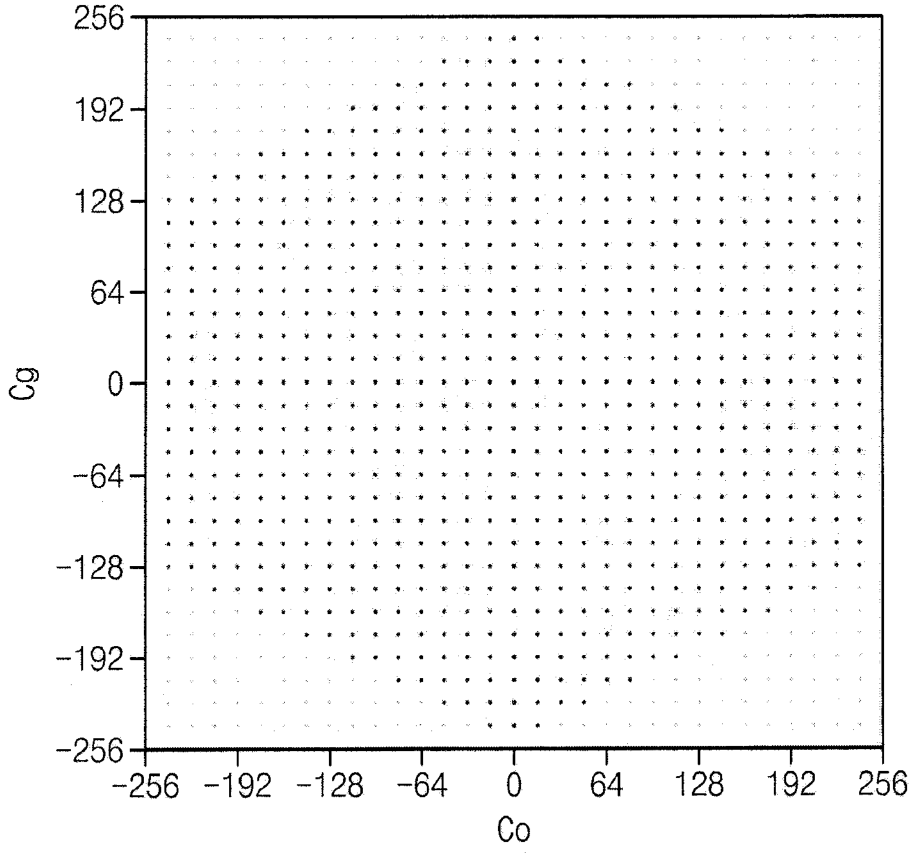
FIG. 7 is a view showing a direction of a color distortion of a first color difference signal and a second color difference signal when a brightness signal is limited after an alternating current component of a brightness signal is emphasized by an image signal processing circuit according to an exemplary embodiment of the present disclosure.

FIG. 7 is a view showing a direction of a color distortion of the first color difference signal and the second color difference signal when the brightness signal is limited after the alternating current component of the brightness signal is emphasized by the image signal processing circuit according to an exemplary embodiment of the present disclosure.

Referring to FIGS. 3 and 7, since the first color difference signal Co and the second color difference signal Cg output from the color converter 310 are provided to the color inverse converter 340 without being changed, the color distortion may not occur on the first color difference signal Co and the second color difference signal Cg. The brightness limiter 330 limits only the range of the third brightness signal Y3 without changing the first color difference signal Co and the second color difference signal Cg, and thus a deterioration in chroma may be reduced.

The use of "may" when describing embodiments of the inventive concept refers to "one or more embodiments of the inventive concept." As used herein, the terms "use," "using," and "used" may be considered synonymous with the terms "utilize," "utilizing," and "utilized," respectively. Also, the term "exemplary" is intended to refer to an example or illustration.

The device and/or any other relevant circuits or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the [device] may be implemented on a flexible printed circuit film, a tape carrier package (TCP), a printed circuit board (PCB), or formed on one substrate. Further, the various components of the [device] may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although the exemplary embodiments of the present invention have been described, it is understood that the present invention should not be limited to these exemplary embodiments but various changes and modifications can be made by one ordinary skilled in the art within the spirit and scope of the present invention as hereinafter recited in the claims, and equivalents thereof.

What is claimed is:

1. An image signal processing circuit comprising:

a color converter to convert first image signals to a first brightness signal, a first color difference signal, and a second color difference signal;

a brightness emphasizer to output a second brightness signal obtained by emphasizing an alternating current component of the first brightness signal;

a brightness limiter to determine an upper limit value and a lower limit value based on the first color difference signal and the second color difference signal and to convert the second brightness signal to a third brightness signal between the upper limit value and the lower limit value; and a color inverse converter to convert the third brightness signal, the first color difference signal, and the second color difference signal to second image signals.

2. The image signal processing circuit of claim 1, wherein the brightness emphasizer comprises:

a filter to extract the alternating current component of the first brightness signal;

a first operator to operate the extracted alternating current component and a gain to output a first intermediate signal;

an amplitude limiter to limit an amplitude of the first intermediate signal to output a second intermediate signal; and a second operator to operate the second intermediate signal and the first brightness signal to output the second brightness signal.

3. The image signal processing circuit of claim 2, wherein the filter is a high pass filter to pass a high-frequency component of the first brightness signal.

4. The image signal processing circuit of claim 2, wherein the filter is a band pass filter to pass a set frequency band of the first brightness signal.

5. The image signal processing circuit of claim 2, wherein the amplitude limiter is to set the first intermediate signal to an amplitude upper limit value when the first intermediate signal is greater than the amplitude upper limit value and to set the first intermediate signal to an amplitude lower limit value when the first intermediate signal is smaller than the amplitude lower limit value.

6. The image signal processing circuit of claim 2, wherein the first operator is a multiplier to multiply the extracted alternating current component and the gain.

7. The image signal processing circuit of claim 2, wherein the second operator is an adder to add the second intermediate signal to the first brightness signal.

8. The image signal processing circuit of claim 2, wherein:

when the first color difference signal is equal to or greater than zero (0), the upper limit value LimU and the lower limit value LimL satisfy the following $$LimU = \begin{cases} YMAX - (Cg+1)/2 & (Cg > Co/2) \\ YMAX - (1 - Co + Cg + CMB)/2 & (\text{otherwise}) \end{cases} \text{ and}$$

$$LimL = \begin{cases} -Cg/2 & (Cg > -Co/2) \\ (Co + Cg - CMB)/2 & (\text{otherwise}) \end{cases},$$

respectively;

when the first color difference signal is smaller than zero (0), the upper limit value LimU and the lower limit value LimL satisfy the following $$LimU = \begin{cases} YMAX - (Cg+1)/2 & (Cg > -Co/2) \\ YMAX - (1 - Co - Cg + CMB)/2 & (\text{otherwise}) \end{cases}, \text{ and}$$

$$LimL = \begin{cases} -Cg/2 & (Cg \le Co/2) \\ (Cg - Co - CMB)/2 & (\text{otherwise}) \end{cases},$$

respectively;

a logical operation of a least significant bit of each of the first color difference signal and the second color difference signal satisfies the following $$CMB=Co\&Cg\&1;$$

the "YMAX" denotes a maximum value of the second brightness signal, the "Co" denotes the first color difference signal, the "Cg" denotes the second color difference signal, "&" denotes a bit logical operation;

the brightness limiter sets the second brightness signal to the upper limit value when the second brightness signal is greater than the upper limit value; and the brightness limiter sets the second brightness signal to the lower limit value when the second brightness signal is smaller than the lower limit value.

9. The image signal processing circuit of claim 1, wherein the color converter is configured to be operated to satisfy the following $$Co=R-B,\ t=B+Co/2,\ Cg=G-t, \text{ and } Y=t+Cg/2; \text{ and}$$

the R, G, and B denote red, green, and blue signals of the first image signals, respectively, the "Y" denotes the first brightness signal, the "Co" denotes the first color difference signal, and the "Cg" denotes the second color difference signal.

10. The image signal processing circuit of claim 1, wherein the color inverse converter is configured to be operated to satisfy the following $$t=Y3-Cg/2,\ G'=Cg+t,\ B'=t-Co/2, \text{ and } R'=Co+B'; \text{ and}$$

the R', G', and B' denote red, green, and blue signals of the second image signals, respectively, the "Y3" denotes the third brightness signal, the "Co" denotes the first color difference signal, and the "Cg" denotes the second color difference signal.

11. A display device comprising:

a display panel comprising a plurality of pixels; and a driving circuit to receive first image signals, to apply data signals corresponding to second image signals to the pixels, and to control the pixels to display an image, the driving circuit comprising an image signal processing circuit to convert the first image signals to the second image signals, the image signal processing circuit comprising:

a color converter to convert the first image signals to a first brightness signal, a first color difference signal, and a second color difference signal;

a brightness emphasizer to output a second brightness signal obtained by emphasizing an alternating current component of the first brightness signal;

a brightness limiter to determine an upper limit value and a lower limit value based on the first color difference signal and the second color difference signal and to convert the second brightness signal to a third brightness signal between the upper limit value and the lower limit value; and a color inverse converter to convert the third brightness signal, the first color difference signal, and the second color difference signal to second image signals.

12. The display device of claim 11, wherein the brightness emphasizer comprises:

a filter to extract the alternating current component of the first brightness signal;

a first operator to operate the extracted alternating current component and a gain to output a first intermediate signal;

an amplitude limiter limiting an amplitude of the first intermediate signal to output a second intermediate signal; and a second operator to operate the second intermediate signal and the first brightness signal to output the second brightness signal.

13. The display device of claim 12, wherein the amplitude limiter is to set the first intermediate signal to an amplitude upper limit value when the first intermediate signal is greater than the amplitude upper limit value and to set the first intermediate signal to an amplitude lower limit value when the first intermediate signal is smaller than the amplitude lower limit value.

14. The display device of claim 12, wherein the first operator is a multiplier to multiply the extracted alternating current component and the gain.

15. The display device of claim 12, wherein the second operator is an adder to add the second intermediate signal to the first brightness signal.

16. The display device of claim 12, wherein:

when the first color difference signal is equal to or greater than zero (0), the upper limit value LimU and the lower limit value LimL satisfy the following $$LimU = \begin{cases} YMAX - (Cg+1)/2 & (Cg > Co/2) \\ YMAX - (1 - Co + Cg + CMB)/2 & (\text{otherwise}) \end{cases},$$

and $$LimL = \begin{cases} -Cg/2 & (Cg > -Co/2) \\ (Co + Cg - CMB)/2 & (\text{otherwise}) \end{cases},$$

respectively;

when the first color difference signal is smaller than zero (0), the upper limit value LimU and the lower limit value LimL satisfy the following $$LimU = \begin{cases} YMAX - (Cg+1)/2 & (Cg > -Co/2) \\ YMAX - (1 - Co - Cg + CMB)/2 & (\text{otherwise}) \end{cases},$$

and $$LimL = \begin{cases} -Cg/2 & (Cg \le Co/2) \\ (Cg - Co - CMB)/2 & (\text{otherwise}) \end{cases},$$

respectively;

a logical operation of a least significant bit of each of the first color difference signal and the second color difference signal satisfies the following $CMB=Co\&Cg\&1$;

the "YMAX" denotes a maximum value of the second brightness signal, the "Co" denotes the first color difference signal, the "Cg" denotes the second color difference signal, "&" denotes a bit logical operation;

the brightness limiter sets the second brightness signal to the upper limit value when the second brightness signal is greater than the upper limit value; and the brightness limiter sets the second brightness signal to the lower limit value when the second brightness signal is smaller than the lower limit value.

17. A method of processing an image signal of a display apparatus, the method comprising:

converting first image signals to a first brightness signal, a first color difference signal, and a second color difference signal by utilizing a color converter;

outputting a second brightness signal obtained by emphasizing an alternating current component of the first brightness signal by utilizing a brightness emphasizer;

determining an upper limit value and a lower limit value based on the first color difference signal and the second color difference signal and converting the second brightness signal to a third brightness signal between the upper limit value and the lower limit value by utilizing a brightness limiter;

converting the third brightness signal, the first color difference signal, and the second color difference signal to second image signals by utilizing a color inverse converter; and providing data signals corresponding to the second image signals to a display panel.

18. The method of claim 17, wherein the outputting of the second brightness signal comprises:

extracting the alternating current component of the first brightness signal;

operating the extracted alternating current component and a gain to output a first intermediate signal;

limiting an amplitude of the first intermediate signal to output a second intermediate signal; and operating the second intermediate signal and the first brightness signal to output the second brightness signal.

19. The method of claim 18, wherein the outputting of the second intermediate signal comprises:

setting the first intermediate signal to an amplitude upper limit value when the first intermediate signal is greater than the amplitude upper limit value; and setting the first intermediate signal to an amplitude lower limit value when the first intermediate signal is smaller than the amplitude lower limit value.

20. The method of claim 17, wherein the converting of the second brightness signal to the third brightness signal comprises:

setting the second brightness signal to the upper limit value when the second brightness signal is greater than the upper limit value; and setting the second brightness signal to the lower limit value when the second brightness signal is smaller than the lower limit value.

* * * * *